United States Patent [19]
Provence et al.

[11] Patent Number: 5,765,666
[45] Date of Patent: Jun. 16, 1998

[54] SUSPENSION STRUTS

[75] Inventors: Marc Provence, Groisy; Jean-Louis Ligier, Chatou, both of France

[73] Assignee: Glacier Vandervell SA, France

[21] Appl. No.: 716,373

[22] PCT Filed: Mar. 17, 1995

[86] PCT No.: PCT/GB95/00586

§ 371 Date: Sep. 19, 1996

§ 102(e) Date: Sep. 19, 1996

[87] PCT Pub. No.: WO95/25913

PCT Pub. Date: Sep. 28, 1995

[30] Foreign Application Priority Data

Mar. 19, 1994 [GB] United Kingdom .................... 9405461

[51] Int. Cl.⁶ .................................................. F16F 9/36
[52] U.S. Cl. ........................... 188/322.17; 92/165 R
[58] Field of Search .................... 188/322.11, 322.16, 188/322.17, 322.22, 284, 315; 267/113, 122, 129, 226; 277/205, 207 R, 212 R, 212 C, 212 F, 211; 92/165 R, 168, 169.1, 171.1

[56] References Cited

U.S. PATENT DOCUMENTS 4,057,236 11/1977 Hennells ............................ 188/315
4,438,834 3/1984 Hanoke ............................. 188/315
5,192,057 3/1993 Wydra ............................... 267/122

FOREIGN PATENT DOCUMENTS 1474297 5/1977 United Kingdom .

*Primary Examiner*—Robert J. Oberleitner
*Assistant Examiner*—C. T. Bartz
*Attorney, Agent, or Firm*—Nixon & Vanderhye P.C.

[57] ABSTRACT

A suspension strut comprises inner and outer tubes and incorporates an end closure constituted by a moulded plastic insert containing a sleeve bearing in the form of a metal bush, the insert being a press fit into the outer tube of the strut and the press fit region of the insert including a portion adapted to engage with and locate in a radial direction the inner tube of the strut, together with at least two circumferential ribs which extend radially from the insert to engage the inner surface of the outer tube, the material of said ribs being in compression, with said ribs being spaced apart axially of the strut to confer a degree of resilience onto the assembly and a fluid seal being provided at or adjacent the outer face of the end closure to minimize fluid losses from the strut along the relatively movable rod thereof.

7 Claims, 6 Drawing Sheets

SUSPENSION STRUTS

TECHNICAL FIELD

This invention relates to suspension struts, particularly, but not exclusively, suitable for automotive use.

BACKGROUND

A typical suspension strut comprises a pair of coaxially disposed tubes, the inner of which contains a piston operated by a piston rod extending from the assembly through an end closure for the strut, the end closure including both bearing and sealing means for the piston rod, to minimise friction and leakage. The other end of the strut is closed. The inner tube is usually full of fluid, typically oil, the outer tube only partly so. Displacement of the piston within the inner tube causes fluid to be transferred from the inner tube to the outer tube via a combination of one-way valves and ports, so that the rate of flow is not necessarily the same for each direction of piston movement. By this means, controlled damping of the piston movement can be achieved. Single tube struts are also known and operate in a generally similar way, by displacement of fluid from one end of the tube to the other in a controlled manner.

In automotive applications, the suspension strut is often used in combination with conventional coil springs and/or torsion bars to achieve acceptable road holding and shock absorption performance.

Because of the forces involved, a suspension strut is generally of all-metal construction, although a plastics coated metal bearing component is commonly used to support and guide the piston rod as part of the end closure where the rod leaves the strut tube assembly. It is usual to provide some form of elastomeric seal in this same area to prevent ingress of dirt and to minimise the risk of leakage of fluid. But for the most part, it is usual to manufacture the end closure through which the piston rod passes from metal, typically from sintered iron. This is because the closure not only serves to locate and guide the piston rod but also to locate the inner and outer tubes relative to one another, as well as providing internal passageways for controlled transfer of fluid from the inner tube to the space between the inner and outer tube. An additional function of the end closure for the tubes is the provision of some means for absorbing the impact caused by over-travel of the piston. Very often this is done by providing on the piston rod a coil spring which is compressed between the piston and the inner end of the closure when the piston overtravels towards the latter. The end closure of a suspension strut is thus exposed to significant stresses including twisting/bending forces, and up to now it has been thought essential to manufacture it from metal, including the attendant machining operations required to provide the close tolerances necessary for satisfactory assembly and operation.

Fitting and sizing the bearing bush is also an important requirement.

SUMMARY OF THE INVENTION

It is an object of the present invention to simplify the construction of the end closure for a suspension strut.

According to the present invention, a suspension strut comprises inner and outer tubes and incorporates an end closure constituted by a moulded plastics insert containing a sleeve bearing in the form of a metal bush, the insert being a press fit into the outer tube of the strut and the press fit region of the insert including a portion adapted to engage with and locate in a radial direction the inner tube of the strut, together with at least two circumferential ribs which extend radially from the insert to engage the inner surface of the outer tube, the material of said ribs being in compression, with said ribs being spaced apart axially of the strut to confer a degree of resilience onto the assembly and a fluid seal being provided at or adjacent the outer face of the end closure to minimize fluid losses from the strut along the relatively movable rod thereof.

The metal bush is preferably provided with a plastics working surface of, for example, a PTFE based bearing material. The plastics insert preferably contains integrally moulded passageways adapted to permit the transfer of fluid from the inner tube of the strut to the space between the inner and outer tubes, as well as to provide a small reservoir of fluid above the bush to ensure lubrication of the latter. The fluid seal may be supported by a plastics cap which is located between the insert and the end of the tube of the strut where said end is rolled over to retain the internal components.

The press-fit region of the plastics insert is thus constituted by at least two circumferential ribs which extend radially to engage with the inner wall of the outer tube, the ribs being spaced apart axially of the assembly. Advantageously, at least three such ribs are provided. This construction provides the insert with an ability to deflect resiliently in response to the asymmetric loading which is encountered in service. By providing for the outer tube to be located relative to the piston rod and inner tube by such an arrangement of ribs, the plastics material of each of which is in compression rather than in tension, it is possible to achieve a degree of resilience not possible with previous all-metal constructions. Shock loadings in the form of side twisting and/or bending forces were previously transferred directly into the metal bush causing distortion and/or excessive wear of the latter, particularly of any plastics coating on the rod contacting surface of the bush. By adopting the construction of this invention, shock loading can be at least in part absorbed by the plastics insert and in particular by the circumferential ribs which resiliently transfer twisting /bending loads to the outer tube whilst keeping the material of the insert under compression, as mentioned earlier.

Furthermore, by varying the geometry of the ribs it is possible to develop different degrees of resilience in the assembly, so that performance can be optimised. Because of the built-in resilience, the instantaneous stresses on the bush are reduced, thereby minimising the risk that the fluid film will be broken by shock loading, as is the case with metal prior art inserts.

Advantageously, the plastics insert is made by injection moulding and according to another aspect of the invention the shaft fluid seal may be integrally moulded with a supporting plastics cap, for example by using a two component moulding process in which an elastomer compound is moulded to form the seal element in situ after moulding the cap itself, the cap and seal being essentially integral. The seal may thus be directly moulded onto the cap.

According to a further aspect of the invention, the insert is provided with a resilient plastics rebound stop, which is preferably a press or a snap fit into or onto the insert. In a particularly preferred arrangement the rebound stop is in the form of a plastics bellows, optionally including a scraper member effective to wipe excess fluid off the piston rod, thereby limiting fluid flow through the associated bush during rebound conditions. Whilst the bellows may be free to slide on the piston rod, as in prior art constructions employing a metal spring, it is preferred that it be attached to the insert as described above, since this serves to locate the bellows precisely and also minimises noise attributable to a loose rebound stop. It also avoids a further disadvantage of a loose, freely moving rebound stop because the latter can be responsible for cavitation in the fluid. Cavitation due to rapid movement of a loose rebound stop is a well-known problem with conventional constructions. Making the rebound stop essentially integral with the insert minimises this problem and also provides a minor amount of hydraulic damping.

Referring specifically to the end of the insert where an oil seal is provided to prevent ingress of dirt and/or other material and to prevent loss of fluid, according to a further aspect of the invention, a plastics end cap is provided for the insert, said end cap including the fluid seal itself. Particularly preferred fluid seals for this application include oil seals made from PTFE or similar fluorocarbon resin. Such a plastics end cap may also include for example an annular scraper member effective to prevent dirt or other particulate matter being carried by the piston rod into the fluid seal and possibly beyond the fluid seal, to the bearing bush. Polyethylene can be used for such a scraper member.

In conventional constructions, the metal end closure is retained by rolling over the end region of the outer tube to form a retaining flange. Advantageously, the same method can be used with the end closures of the present invention. In another aspect of the invention, the portion of the plastics housing which is covered by the retaining flange after assembly is provided with at least one axially directed rib, more preferably a series of concentric axially directed ribs, to act as a peripheral labyrinth seal against leakage between the flange and the insert.

The present invention thus contemplates the use of an end closure which comprises more than one plastics material. Furthermore, such multi-component end closures may be made by mechanical assembly, or by two-component moulding techniques.

In order than the invention be better understood, preferred embodiments of it will now be described by way of example with reference to the accompanying drawings.

DETAILED DESCRIPTION OF THE INVENTION

Figure 1:
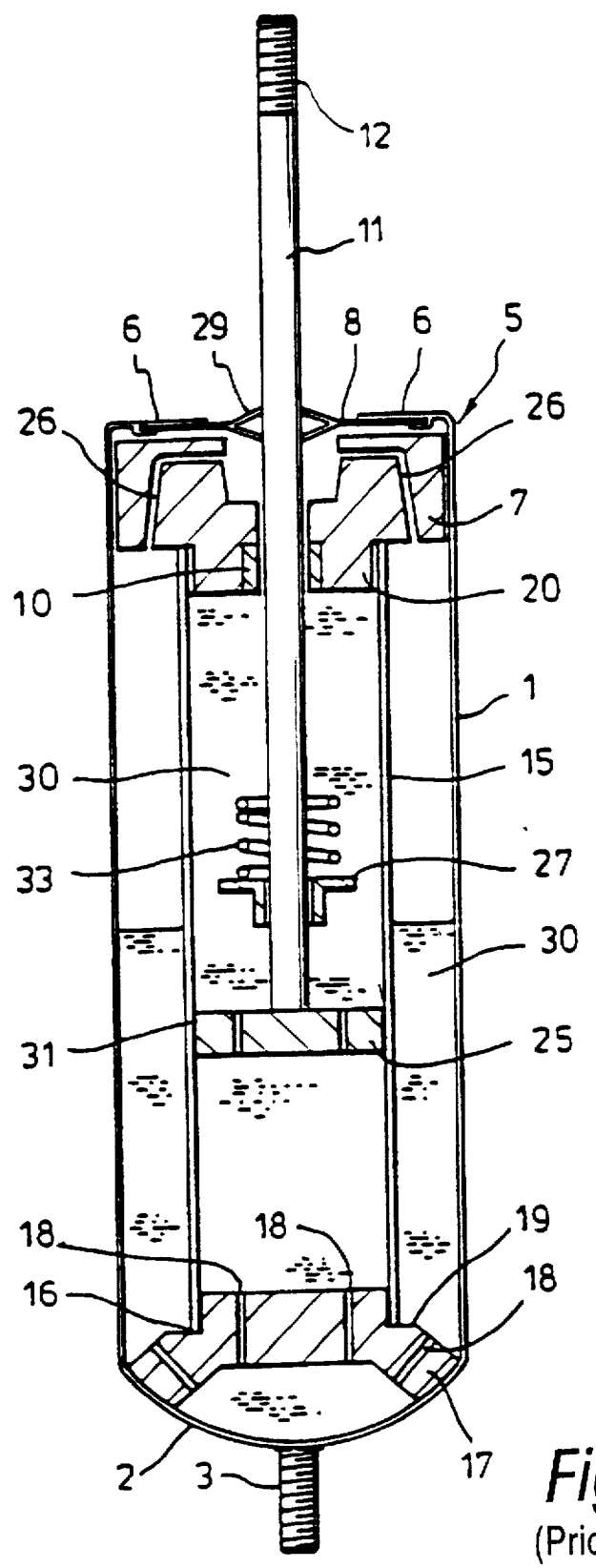
FIG. 1 is a schematic side view of a conventional two tube suspension strut, partly in section.

In all Figures, like reference numerals will be applied as far as possible to like parts, in order to simplify understanding of the inventive concepts.

Referring firstly to FIG. 1, a generally tubular container 1 is closed at one end 2 where a screw-threaded mounting bolt 3 is attached. The opposite end 5 of the container 1 is closed by rolling over its end margin to form a retaining flange 6 around a cap constituted by a sintered metal insert 7, with an elastomeric fluid seal 8 interposed between the insert and the crimped part 6 of the casing. The insert 7 has a central bore 9 containing a bearing bush 10 through which a piston rod 11 extends, the free end 12 of this rod being screw-threaded for mounting/attachment purposes. It also has drilled internal passageways 26 whereby fluid can pass between inner and outer tubes as explained below.

Inside the casing 1 there is an inner tube 15 which is supported at one end 16 by a mounting 17 which incorporates a passageways 18 to control the flow from inner to outer tubes, and vice versa. The mounting 17 is located in the closed end of the casing 1; the tube 15 seats onto an annular collar 19, the latter being a push fit in the tube end.

The opposite end of the tube 15 is supported in similar manner by a collar 20 formed on the insert 7, this collar being also a push fit in the tube 15. The tube 15 is thus closed at both ends by the mounting 17 and the insert 7 respectively. The piston rod 11 is connected to a piston 25 which is a sliding fit in tube 15.

The piston is provided with a two-way valve assembly 31 which provides for controlled flow of fluid through the piston in either direction, to establish the desired degree of damping on axial displacement of the piston rod 11.

The insert 7 is provided with fluid passageways 26 which allow the controlled passage of fluid from the inside of the tube 15 (above the piston) to the casing around the tube 15. The piston rod 11 carries a fixed flanged washer 27. This co-operates with a freely slidable coil spring 33 which serves as a resilient rebound stop when the piston approaches the upper limit of its travel.

The tube 15 is substantially filled with a hydraulic fluid; the casing 1 is partly filled with the same fluid. To prevent or at least minimise leakage of fluid along the rod 11, the sealing member 8 incorporates a sliding seal element 29.

Controlled leakage through the piston 25 is provided by ports 31, which may incorporate one way valves.

In use, the strut is mounted at both ends to relatively movable parts of a vehicle suspension system (not shown). Movement of the suspension system parts causes displacement of the piston rod and therefore of the piston in the tube 15. This in turn causes displacement of fluid, the rate of displacement being determined by the configuration of the passageways at each end of the tube 15. By providing flow control valve means and/or by appropriately selecting the sizes of passageway, controlled damping of the piston movement is readily achieved, the degree of damping being the same or different for oppositely directed movements of the piston, according to the design requirements of the suspension system.

It will be recognised that the foregoing description is essentially of a conventional strut construction; it is not necessary to go into further detail.

Referring now to FIGS. 2–6, FIG. 2 shows the upper end 5 of the strut modified in accordance with the present invention. Thus the insert 7 is constituted by moulded plastics member having radially directed ribs 40, 41 and an axially directed boss 20 which is a push fit into the confronting end of tube 15. At the opposite end of the insert there is a cylindrical boss 43 which constitutes the portion onto which the free end portion 6 of the tube 1 is rolled. The boss 43 is also provided with a plurality of radially inwardly directed ribs 44. These support the sealing member 8 against the tube portion 6. The member 8 is of rubber, with a steel reinforcing core 45 and a garter spring 46, the latter serving to bias the lower lip 47 of the seal into engagement with the piston rod 11. An upper lip 48 serves to prevent ingress of dirt whilst the lower lip 47 has as its primary function the prevention of fluid escape from the chamber defined between the seal 8 and the insert 7. The latter also carries the bearing bush insert 10.

A moulded plastics rebound stop 28 is snap fitted into the insert 7 to abut against the bearing bush insert 10.

Because of the design of the insert 7, with radially directed ribs 40, 41, the assembly is resilient, in contrast to the rigidity of the traditional metal insert in FIG. 1. Eliminating the machined metal insert reduces cost; the resilience reduces wear and tear on the bearing bush 10. Because the rebound stop is captive, it does not cause cavitation in the fluid and/or noise during normal operation.

Figure 2:
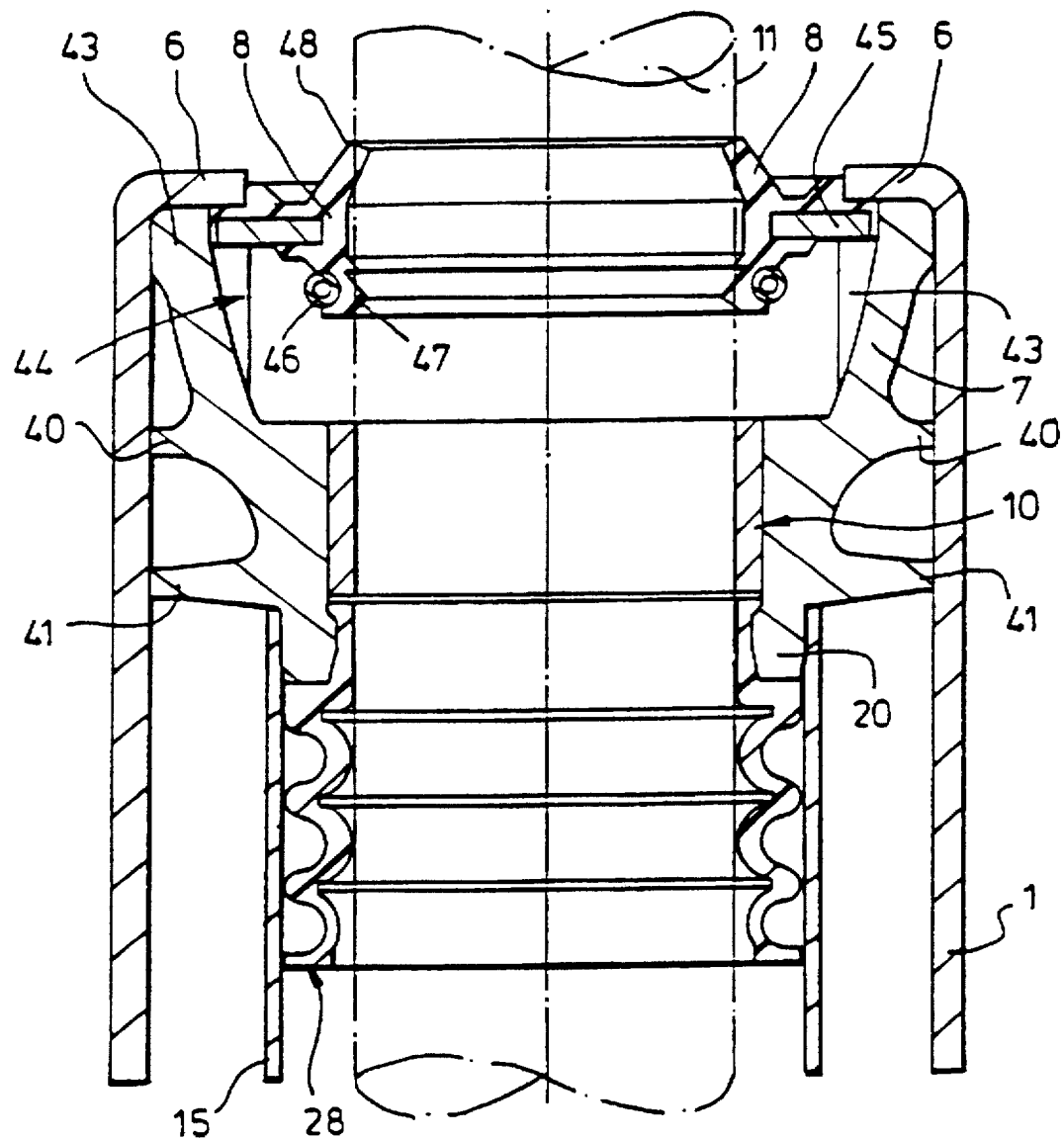
FIG. 2 is a cross-sectional side view of a region of the strut of FIG. 1 modified in accordance with this invention.
Figure 3A:
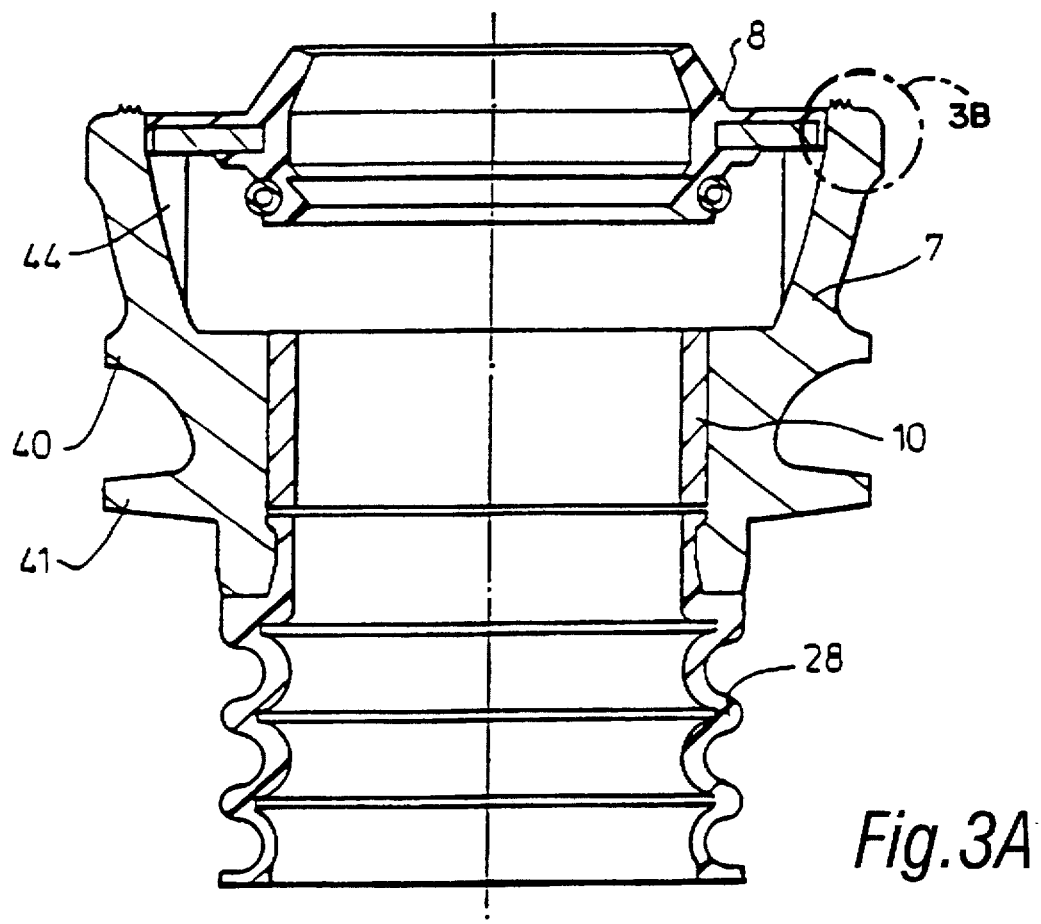
FIG. 3 is a cross-sectional side view of the region of the strut shown in FIG. 1, but showing a modified construction.
Figure 3B:
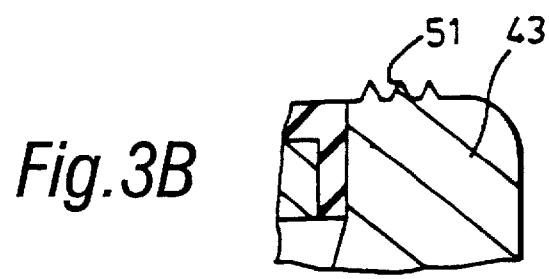

FIG. 3 illustrates a modification of FIG. 2, in that the boss 43 is provided with a plurality of axially directed ribs 51, the purpose of which is to enhance the sealing of the assembly, the ribs being crushed by the tube portion 6.

Figure 4:
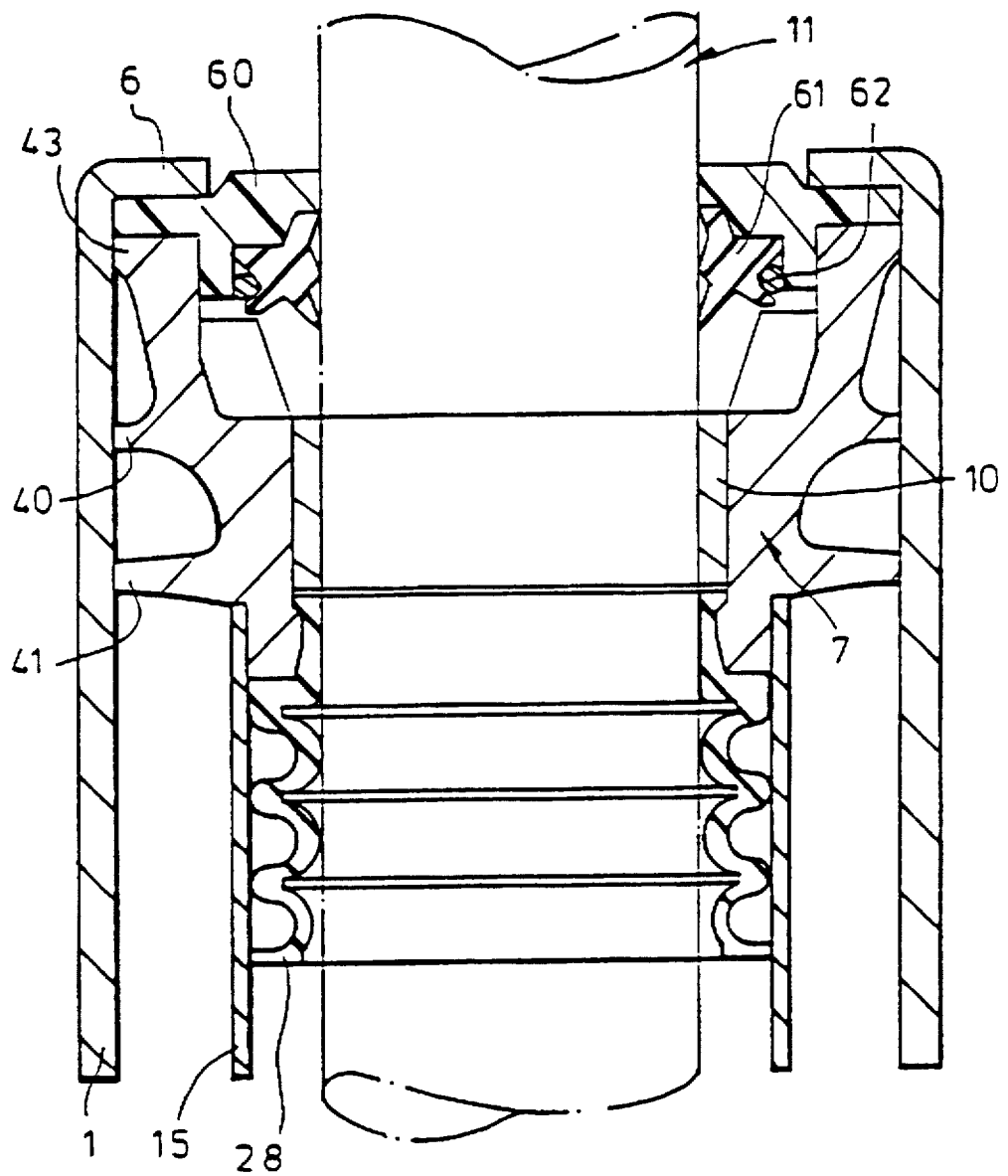
FIG. 4 is a cross-sectional side view of a further modification of the region of the strut shown in FIG. 1.

FIG. 4 illustrates a different way of constructing the seal 8. I this case, a rigid plastics cap 60 is press fitted, or thermally welded into the insert 7. This cap contains a PTFE labyrinth seal 61, together with a retaining O ring 62, the latter serving to bias the seal 61 against the rod 11 and to enhance the sealing between the cap 60 and the seal 61.

Figure 5:
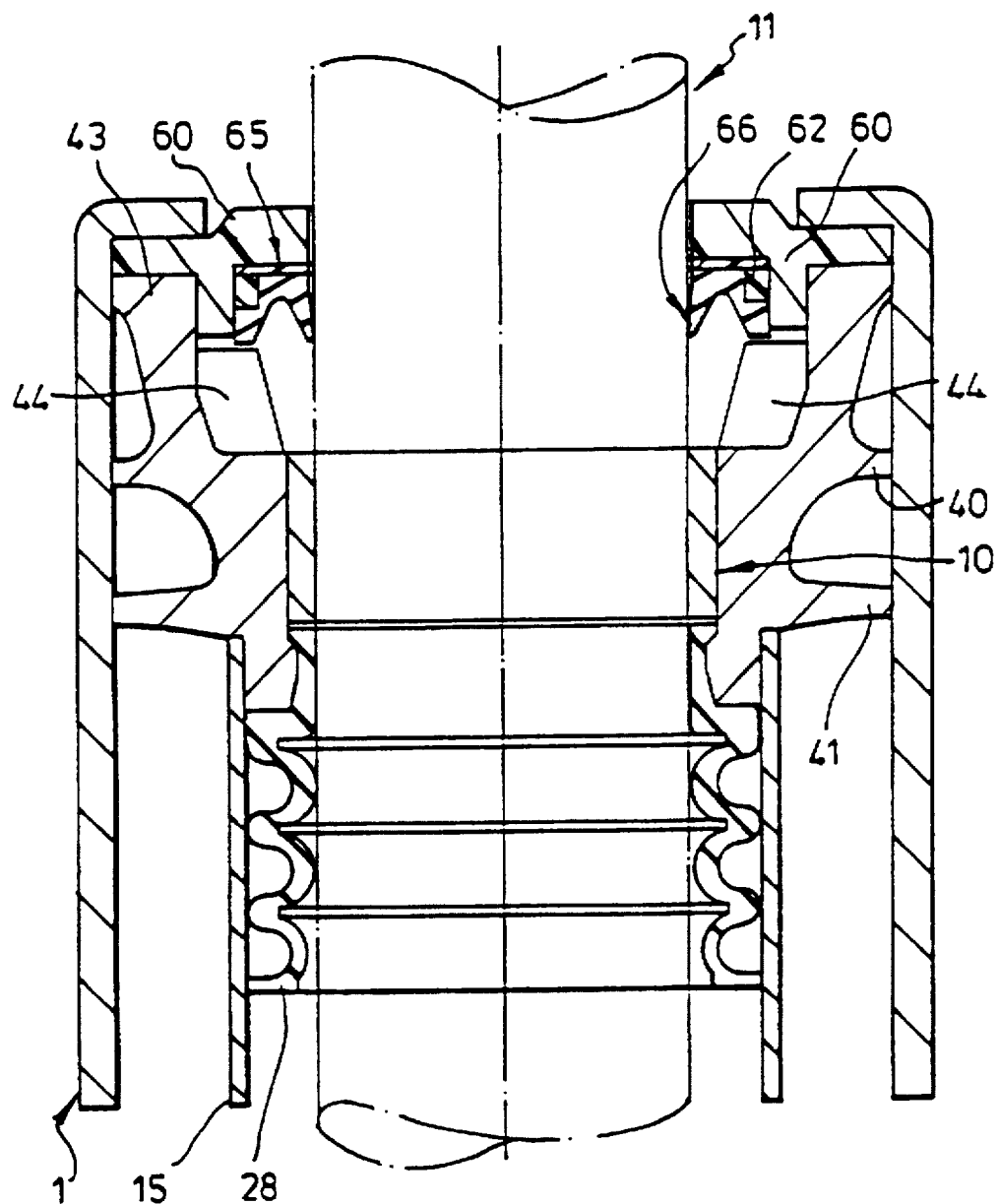
FIG. 5 is a cross-sectional side view of a further modification of the region of the strut shown in and, FIG. 6 is a cross-sectional side view of yet another modification of the region of the strut shown in FIG. 1.

In FIG. 5, a further modification of FIG. 4 is shown. The plastics cap 60 is essentially the same, but an annular plastics ring 65, for example of PTFE or polypropylene is provided as a dust seal. The PTFE seal has a single downwardly directed lip 66. Again, an O ring 62 is used to bias the PTFE seal against the rod 11 and to enhance the sealing between the cap 60 and the seal 66.

Figure 6:
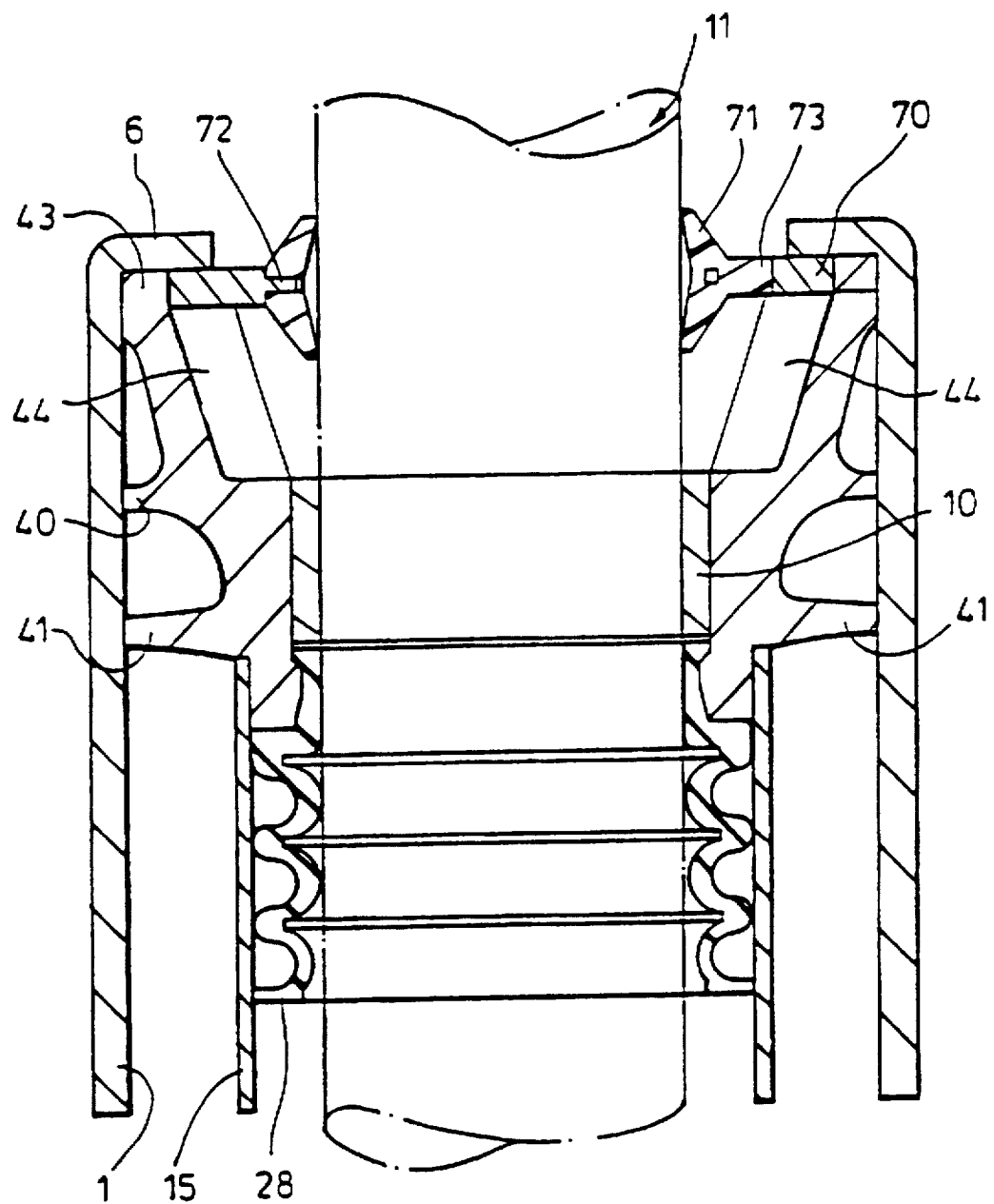

FIG. 6 illustrates how the seal 8 may be made by two-component injection moulding. A rigid annulus 70 of a thermoplastics material supports a flexible thermoplastics seal 71. The components may be mechanically interlocked (72) or chemically fused (73), according to their respective properties and chemical structure.

In FIGS. 4, 5 and 6 the sealing between the outer tube 1 and the insert 7 is achieved through the use of the axially directed ribs as like described earlier in relation to FIG. 3.

In an alternative arrangement the sealing member 8 is constituted by an elastomer material moulded directly onto the insert 7. The O ring 46 may then be is relocated to the outside upper surface of the seal 8, which may simplify assembly. The construction is otherwise generally similar to the previous embodiments.

We claim:

1. A suspension strut assembly comprising inner and outer tubes and a piston rod within said inner tube; an end closure constituted by a one-piece moulded plastic insert continuing a sleeve bearing in the form of a metal bush through which said piston rod moves, the insert being a press fit into the outer tube of the strut and the press fit region of the insert including a portion adapted to engage with and locate in a radial direction the inner tube of the strut, said one-piece moulded plastic insert having at least three circumferential ribs which extend radially from the insert to engage the inner surface of the outer tube, the material of said ribs being in radial compression, with said ribs being in radial compression, with said ribs being spaced apart axially of the strut to confer a degree of resilience onto the assembly; and a fluid seal being provided at or adjacent the outer face of the end closure to minimize fluid losses from the strut assembly along said piston rod; and wherein the insert is retained in the strut end by an abutting flange formed in the outer tube which engages an axially outwardly directed face of the insert.

2. A strut according to claim 1 wherein the insert contains integrally moulded passageways adapted to permit the transfer of fluid from the inner tube of the strut to the space between the inner and outer tubes, as well as to provide a reservoir of fluid above the bush.

3. A strut according to claim 1 wherein the fluid seal is supported by a rigid plastics member located between the insert and the fluid seal.

4. A suspension strut according to any preceding claim 1 provided with a rebound stop in the form of a plastics bellows.

5. A suspension strut according to claim 4 wherein said plastics bellows is snap fitted onto or into the insert and is retained thereby.

6. A suspension strut according claim 1 wherein the insert is provided with at least one axially directed annular rib, said rib being disposed so that the abutting flange and rib cooperate to minimize leakage.

7. A suspension strut assembly comprising inner and outer tubes and a piston rod within said inner tube; an end closure constituted by a plastic insert containing a sleeve bearing for said relatively movable rod in the form of a metal bush, the insert being a press fit into the outer tube of the strut and the press fit region of the insert including a portion adapted to engage with and locate in a radial direction the inner tube of the strut, said plastic insert further including at least two circumferential ribs which extend radially from the insert to engage the inner surface of the outer tube, the material of said ribs being in radial compression, with said ribs being spaced apart axially of the strut, said ribs being the sole fluid seal between the insert and the inner surface, thereby conferring a degree of resilience onto the assembly; and a fluid seal being provided at or adjacent the outer face of the end closure to minimize fluid losses from the strut assembly along said movable rod.

* * * * *